(12) United States Patent
Shih

(10) Patent No.: US 8,009,202 B2
(45) Date of Patent: Aug. 30, 2011

(54) DEVICE AND METHOD FOR CAPTURING AN IMAGE OF A HUMAN FACE

(75) Inventor: Chi-Hung Shih, Tapiei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 613 days.

(21) Appl. No.: 12/061,918

(22) Filed: Apr. 3, 2008

(65) Prior Publication Data
US 2009/0153689 A1 Jun. 18, 2009

(30) Foreign Application Priority Data

Dec. 17, 2007 (CN) .......................... 2007 1 0203153

(51) Int. Cl.
*H04N 5/228* (2006.01)
(52) U.S. Cl. ..................................... 348/222.1; 348/234
(58) Field of Classification Search ............... 348/222.1, 348/207.99, 234; 382/118, 115, 117
See application file for complete search history.

(56) References Cited

U.S. PATENT DOCUMENTS

| | | | |
|---|---|---|---|
| 7,668,451 B2 * | 2/2010 | Misawa | 396/121 |
| 2005/0047655 A1 | 3/2005 | Luo et al. | |
| 2007/0014431 A1 * | 1/2007 | Hammoud et al. | 382/103 |
| 2007/0070214 A1 * | 3/2007 | Nakamura | 348/222.1 |
| 2007/0195171 A1 * | 8/2007 | Xiao et al. | 348/207.99 |
| 2007/0196097 A1 | 8/2007 | Sugimoto | |
| 2007/0258656 A1 * | 11/2007 | Aarabi | 382/254 |
| 2008/0050015 A1 * | 2/2008 | Lu et al. | 382/173 |
| 2008/0074529 A1 * | 3/2008 | Terashima | 348/345 |
| 2009/0297038 A1 * | 12/2009 | Ishikawa et al. | 382/209 |

FOREIGN PATENT DOCUMENTS

| | | |
|---|---|---|
| CN | 1697478 A | 11/2005 |
| CN | 101013250 A | 8/2007 |

* cited by examiner

*Primary Examiner* — Sinh Tran
*Assistant Examiner* — Kent Wang
(74) *Attorney, Agent, or Firm* — Altis Law Group, Inc.

(57) ABSTRACT

An image capturing device includes an image sensing unit for sensing an image of a human face, an image processing unit, and a memory device. The image processing unit includes a face detection module, a brightness obtaining module, a comparing module, and an adjustment module. The face detection module is configured for detecting human faces in images sensed by the image sensing unit. The brightness obtaining module is configured for obtaining the brightness of a set of areas in the image corresponding to a set of preset portions of each human face. The comparing module is configured for comparing brightness of each of the areas to a threshold value. The adjustment module is configured for adjusting the image by decreasing the brightness of the areas whose brightness is greater than the threshold value. The memory device is able to store the images adjusted by the image processing unit.

5 Claims, 3 Drawing Sheets

DEVICE AND METHOD FOR CAPTURING AN IMAGE OF A HUMAN FACE

TECHNICAL FIELD

The present invention relates to an image capturing device and, particularly, to an image capturing device which can detect and correct over bright areas in an image of a human face.

DESCRIPTION OF RELATED ART

With the development of optical imaging technology, image capturing devices are widely used now. A flash system is usually used with the image capturing devices for generating a flash of light to illuminate a subject, when ambient light is not bright enough. However, if the subject is a person's face, too much light may be reflected by portions of the face (such as those parts that may be oily) resulting in relatively bright patches in the image of the face.

What is needed, therefore, is an image capturing device which can solve the above problem.

SUMMARY

In accordance with one present embodiment, an image capturing device includes an image sensing unit, an image processing unit, and a memory device. The image processing unit includes a face detection module, a brightness obtaining module, a comparing module, and an adjustment module. The face detection module is configured for detecting human faces in images sensed by the image sensing unit. The brightness obtaining module is configured for obtaining brightness of a set of areas in the image corresponding to a set of preset portions of a human face when the face detection module detects at least one face existing in the image. The comparing module is configured for comparing the brightness of each area in the image corresponding with the preset portions to a threshold value. The adjustment module is configured for adjusting the image by decreasing the brightness of the areas whose brightness is greater than the threshold value. The memory device is able to store images adjusted by the image processing unit.

BRIEF DESCRIPTION OF THE DRAWING

Many aspects of the present image capturing device can be better understood with reference to the following drawings. The components in the drawing are not necessarily drawn to scale, the emphasis instead being placed upon clearly illustrating the principles of the present image capturing device. Moreover, in the drawings, like reference numerals designate corresponding parts throughout the several views.

DETAILED DESCRIPTION OF THE EMBODIMENTS

Embodiments will now be described in detail below, with reference to the drawings.

Figure 1:
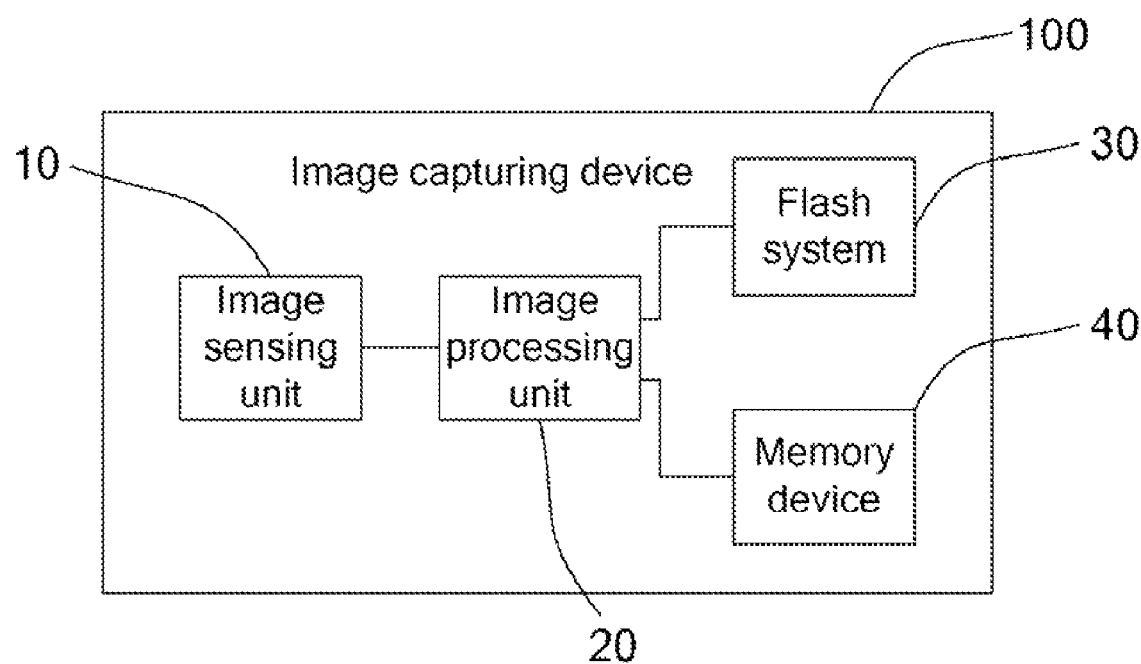
FIG. 1 is a schematic, functional block diagram of an image capturing device.

Referring to FIG. 1, an image capturing device 100 according to an embodiment is shown. The image capturing device 100 includes an image sensing unit 10, an image processing unit 20, a flash system 30, and a memory device 40. The image capturing device 100 can be for example, a digital camera, a video camera, or a mobile phone having a digital image capturing function.

The image sensing unit 10 typically includes a taking lens (not shown) and an image sensor (not shown) disposed behind the taking lens for converting an optical image into an electrical image signal. The image sensor can be a charge-coupled device (CCD) or a complementary metal oxide semiconductor device (CMOS).

Figure 2:
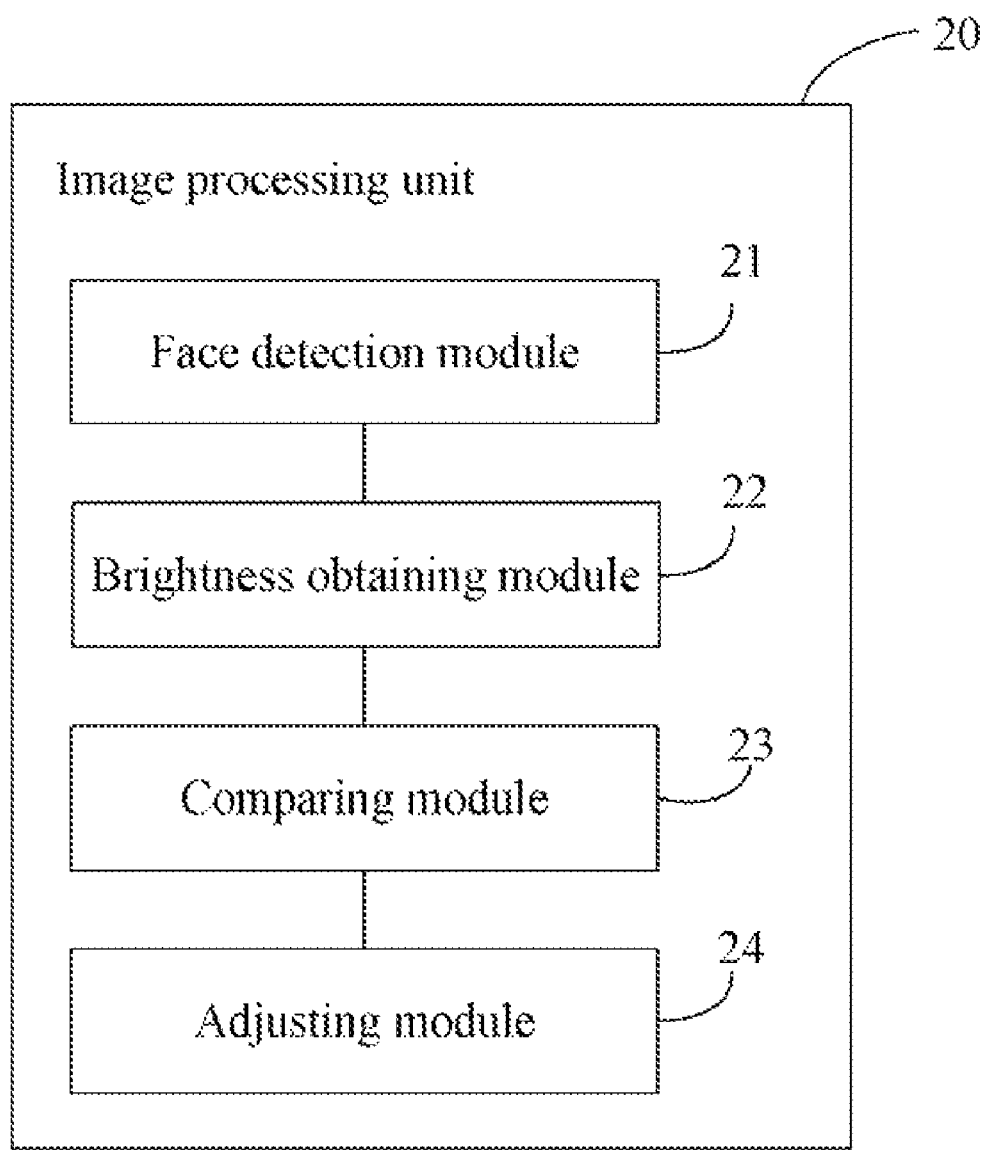
FIG. 2 is a functional block diagram of an image processing unit of the image capturing device of FIG. 1.

The image processing unit 20 is electrically connected to the image sensor of the image sensing unit 10. Referring to FIG. 2, the image processing unit 20 includes a face detection module 21, a brightness obtaining module 22, a comparing module 23, and an adjustment module 24.

The face detection module 21 is used for detecting human faces in an image sensed by the image sensor of the image sensing unit 10.

If the face detection module 21 detects at least one face existing in the image, the brightness obtaining module 22 will obtain brightness of each area of a set of areas in the image corresponding to a set of preset portions of a human face known for often reflecting too much light (appearing too bright in an image). Typically, these areas are the forehead, nose, cheek, and chin, but other areas may be selected as well.

The comparing module 23 is used for comparing the brightness of each area in the image corresponding with the preset portions to a threshold value. If brightness of an area is greater than the threshold value, then it is determined that that area of the image needs to be adjusted.

The adjustment module 24 is used for adjusting the image by decreasing the brightness of the areas corresponding with the preset portions that are judged to be brighter than the brightness threshold. The brightness of the areas can be decreased to the threshold value or to an average value.

The flash system 30 is configured for generating a flash of light to illuminate a scene in order to increase the brightness of the image captured by the image capturing device 100.

The memory device 40 can store the image sensed by the image sensor directly when the face detection module 21 detects no human face existing in the image. The memory device 40 can also store the image adjusted by the image processing unit 20.

Figure 3:
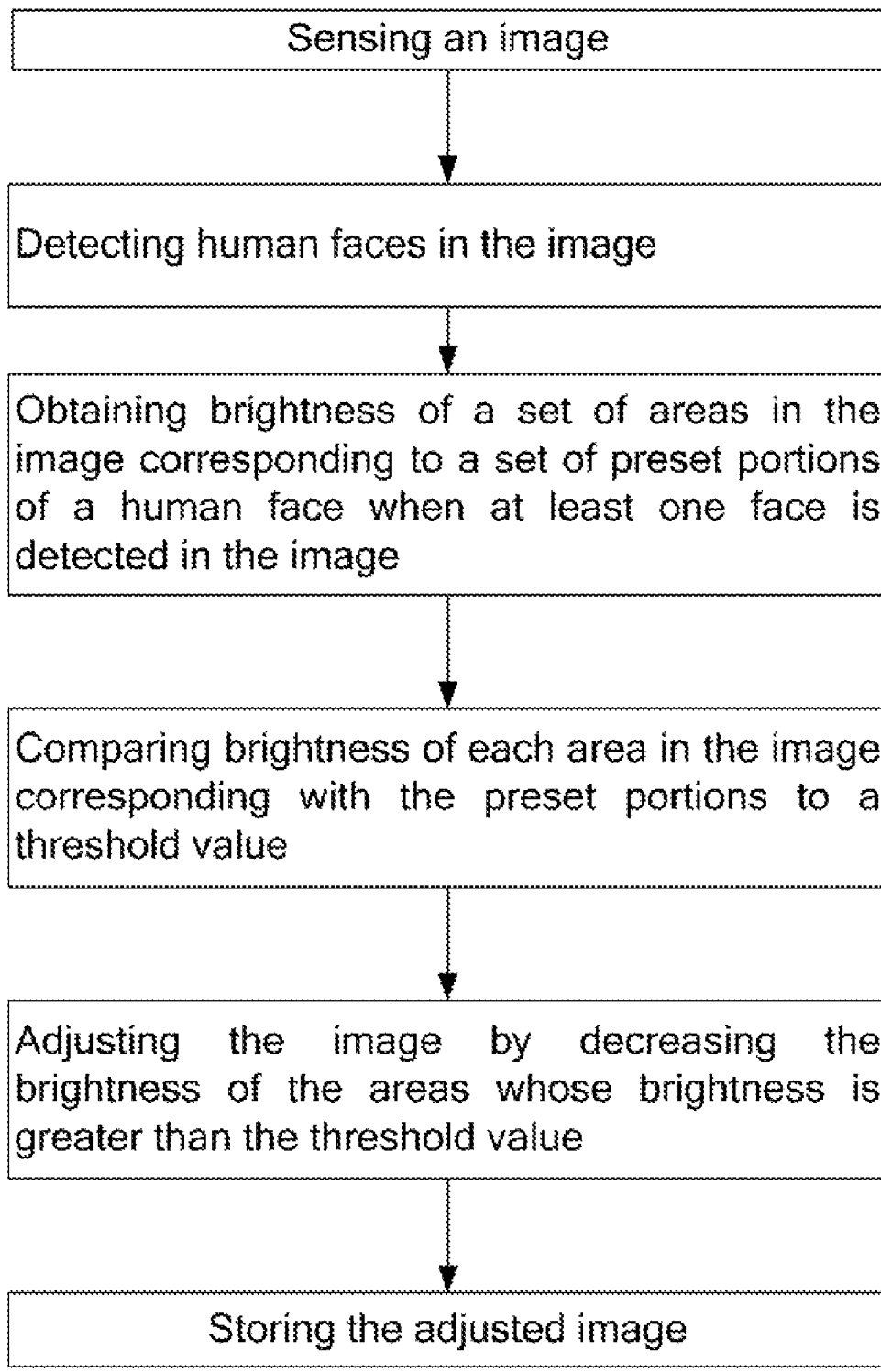
FIG. 3 is a flow chart of a method for capturing an image of the image capturing device.

Referring to FIG. 3, a method for capturing an image of the image capturing device 100 is also provided. The method includes the steps of: sensing an image; detecting human faces in the image; obtaining brightness of a set of areas in the image corresponding to a set of preset portions of human faces when at least one face is detected in the image; comparing brightness of each area in the image corresponding with the preset portions to a threshold value; adjusting the image by decreasing the brightness of the areas whose brightness is greater than the threshold value; and storing the adjusted image.

The preset portions can be selected from a group consisting of forehead, nose, cheek, and chin of the face. The method also includes a step of storing the images directly, if no human face is detected in the image after the step of detecting human faces in the image. The method also includes a step of storing the image directly, if the brightness of each area in the image corresponding to the preset portions is equal to or less than the threshold value after the step of comparing brightness of each area to the threshold value. The method of decreasing the brightness of the area is to decrease the brightness of the areas to an average brightness of corresponding faces or to the threshold value.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. An image capturing device comprising:
    an image sensing unit;
    an image processing unit, including:
        a face detection module for detecting human faces in images sensed by the image sensing unit;
        a brightness obtaining module for obtaining brightness of a set of areas in the image corresponding with a set of preset portions of a human face selected from a group consisting of nose and chin for image capturing when the face detection module detects at least one face existing in the image;
        a comparing module for comparing the brightness of each area in the image corresponding with the preset portions to a threshold value; and
        an adjusting module for adjusting the image by decreasing the brightness of the areas whose brightness is greater than the threshold value, wherein the decrease is to an average brightness of corresponding faces or to the threshold value of corresponding faces; and
    a memory device for storing images adjusted by the image processing unit.

2. The image capturing device as claimed in claim 1, wherein the memory device is for storing the image sensed by the image sensing unit when the face detection module detects no human face existing in the image.

3. A method for capturing an image of an image capturing device, comprising:
    sensing an image;
    detecting human faces in the image;
    obtaining brightness of a set of areas in the image corresponding to a set of preset portions of a human face selected from a group consisting of nose and chin when at least one face is detected in the image;
    comparing brightness of each area in the image corresponding with the preset portions to a threshold value;
    adjusting the image by decreasing the brightness of the areas whose brightness is greater than the threshold value, wherein the decrease is to an average brightness of corresponding faces or to the threshold value of corresponding faces; and
    storing the adjusted image.

4. The method as claimed in claim 3, further comprising a step of storing the images directly, if no human face is detected in the image after the step of detecting human faces in the image.

5. The method as claimed in claim 3, further comprising storing the image directly, if the brightness of each area in the image corresponding with the preset portions is smaller than the threshold value after the step of comparing brightness of each area to the threshold.

* * * * *